(12) United States Patent
McClure et al.

(10) Patent No.: US 7,614,593 B2
(45) Date of Patent: Nov. 10, 2009

(54) LINED CLAMP FOR HOSES AND CONTROL LINES

(75) Inventors: Lawrence M. McClure, Katy, TX (US); William Max Goodman, Richmond, TX (US)

(73) Assignee: International Clamps, Inc., Richmond, TX (US)

( * ) Notice: Subject to any disclaimer, the term of this patent is extended or adjusted under 35 U.S.C. 154(b) by 178 days.

(21) Appl. No.: 11/804,276

(22) Filed: May 17, 2007

(65) Prior Publication Data

US 2008/0283687 A1 Nov. 20, 2008

(51) Int. Cl.
*A47B 96/06* (2006.01)
(52) U.S. Cl. .............. 248/229.14; 248/58; 248/61; 248/62; 248/74.1; 248/65; 403/309; 403/310; 403/351; 403/276
(58) Field of Classification Search .......... 248/229.14, 248/58, 61, 62, 74.1, 65; 403/309, 310, 351, 403/276
See application file for complete search history.

(56) References Cited

U.S. PATENT DOCUMENTS

| | | | | |
|---|---|---|---|---|
| 1,063,852 A | * | 6/1913 | Carpenter et al. | 248/74.4 |
| 4,006,874 A | * | 2/1977 | McGee | 248/74.3 |
| 4,393,998 A | * | 7/1983 | Allen et al. | 248/74.1 |
| 4,437,791 A | * | 3/1984 | Reynolds | 405/224.2 |
| 4,566,819 A | * | 1/1986 | Johnston | 403/385 |
| 4,632,221 A | * | 12/1986 | Stanford | 182/186.8 |
| 5,184,794 A | * | 2/1993 | Saito | 248/68.1 |
| 5,435,506 A | * | 7/1995 | Wiley | 248/74.1 |
| 5,542,776 A | * | 8/1996 | Reynolds | 403/389 |
| 6,135,398 A | * | 10/2000 | Quesnel | 248/74.1 |
| 6,431,502 B1 | * | 8/2002 | Goodman | 248/74.1 |
| 6,726,166 B2 | * | 4/2004 | Goodman | 248/229.14 |
| 6,786,302 B2 | * | 9/2004 | Liew et al. | 182/186.8 |
| 6,799,607 B1 | * | 10/2004 | Friedline et al. | 138/106 |
| D499,957 S | * | 12/2004 | Friedline et al. | D8/380 |
| 6,892,990 B2 | * | 5/2005 | Pisczak | 248/74.4 |
| D516,416 S | * | 3/2006 | Friedline et al. | D8/380 |
| 7,195,038 B2 | * | 3/2007 | Friedline et al. | 138/106 |
| 7,472,870 B2 | * | 1/2009 | Zagorski et al. | 248/65 |
| 7,478,783 B2 | * | 1/2009 | Royer | 248/74.1 |

* cited by examiner

*Primary Examiner*—J. Allen Shriver, II
*Assistant Examiner*—Alaeddin Mohseni
(74) *Attorney, Agent, or Firm*—John R. Casperson

(57) ABSTRACT

A clamp with liner and mounting base are provided for the attachment of control lines to a subsea riser. The clamp comprises an upper clamp half and a lower clamp half. Each clamp half is hingedly connected along a hinge edge of each clamp half to the other clamp half and latchably connected along a latch edge of each clamp half to the other clamp half by latch structure carried by each clamp half. The latch structure carried by the upper clamp half comprises a pair of parallel ears protruding transversely away from the latch edge of the upper clamp half and defining a pair of aligned boreholes, a pivot pin having a transverse borehole carried by the aligned boreholes through the ears, a bolt carried in the transverse borehole through the pivot pin, and a toggle bar having a threaded transverse borehole therethrough threadably mounted on the bolt. The latch structure carried by the lower clamp half comprises a pair of parallel ears protruding transversely from the latch edge of the lower clamp half and defining a pair of saddles facing away from the upper clamp half and contoured for close receipt of the toggle bar. Each clamp half has an inner surface defining a laterally bounded depression for receiving and locating a liner element having a portion shaped to fit the depression.

7 Claims, 3 Drawing Sheets

US 7,614,593 B2

LINED CLAMP FOR HOSES AND CONTROL LINES

FIELD OF THE INVENTION

In one aspect, this invention relates to a clamp. In another aspect, this invention relates to a liner for a clamp. In further aspects, this invention relates to a mounting structure for a clamp. In additional aspects, this invention relates to a clamp and method for securing hoses and control lines to a subsea riser structure

BACKGROUND OF THE INVENTION

Subsea clamps for use in the offshore oil and gas industries have to be durable and rugged to withstand the rigors of use. They also have to be reliable in their function, because repairs in the subsea environment are difficult and expensive. It is also desirable that the clamps have few loose parts, because they are handled in an area where dropped parts can be lost overboard. It is further desirable that the clamps be padded, so as to reduce the risk of damaging the hoses and control lines secured by them.

OBJECTS OF THE INVENTION

It is an object of the invention to provide a clamp which is well suited for subsea use in the oil and gas industry.

SUMMARY OF THE INVENTION

One embodiment of the invention is provided in the form of a combination of a tubular riser, a mounting assembly, a clamp assembly, and a control line assembly. The tubular riser is positioned in a body of water. The mounting assembly is positioned on the tubular riser. The clamp assembly is positioned on the mounting assembly. A control line is positioned in the clamp assembly parallel to the riser.

A novel clamp assembly useful in the combination comprises an upper clamp half and a lower clamp half. Each clamp half is hingedly connected along a hinge edge of each clamp half to the other clamp half and latchably connected along a latch edge of each clamp half to the other clamp half by latch structure carried by each clamp half. The latch structure carried by the upper clamp half comprises a pair of parallel ears protruding transversely away from the latch edge of the upper clamp half and defining a pair of aligned boreholes, a pivot pin having a transverse borehole carried by the aligned boreholes through the ears, a bolt carried in the transverse borehole through the pivot pin, and a toggle bar having a threaded transverse borehole therethrough threadably mounted on the bolt. The latch structure carried by the lower clamp half comprises a pair of parallel ears protruding transversely from the latch edge of the lower clamp half and defining a pair of saddles facing away from the upper clamp half and contoured for close receipt of the toggle bar. The toggle bar and the pivot pin each have a longitudinal axis which is parallel to the longitudinal axis of the riser.

Preferably, each clamp half has an inner surface defining a laterally bounded depression for receiving and locating a liner element having a portion shaped to fit the depression.

A novel liner element suitable for use in the clamp described above can be positioned in each clamp half Each liner element is formed from a rubbery body having an inner face facing the control line and an outer face to face the inner surface of a clamp half Each liner element has an upper end and a lower end. The inner face of each liner element defines at least one semi cylindrical trough extending from the upper end to the lower end of the element. The outer face defines a protruding block spaced apart from the first end and the second end which is closely received by the depression in the clamp half.

A novel mounting assembly useful in the combination described above comprises a mounting base and a pair of U-bolts connected to the mounting base. The mounting base comprises a base plate having a front side and a back side, a nose-piece extending from the front side of the base plate, and a frame extending from the back side of the base plate for mounting the mounting base to the riser. The mounting base defines four slot-shaped apertures arranged in a rectangular array for receiving the pair of U-bolts. The frame defines a pair of juxtaposed hyperbolic-shaped saddles positioned in parallel planes each for providing the mounting assembly with two-point contact with a tubular member upon which the assembly is mounted.

A further embodiment of the invention is provided in the form of a method for running control lines alongside a riser tube as the riser tube is lowered into a body of water.

DETAILED DESCRIPTION OF THE INVENTION

One embodiment of the invention is provided in the form of a combination of a tubular riser 2, a mounting assembly 4, a clamp assembly 6, and a control line assembly 8. The tubular riser is positioned in a body of water. The mounting assembly is positioned on the tubular riser. The clamp assembly is positioned on the mounting assembly. At least one control line 9 is positioned in the clamp assembly parallel to the riser.

Figure 1:
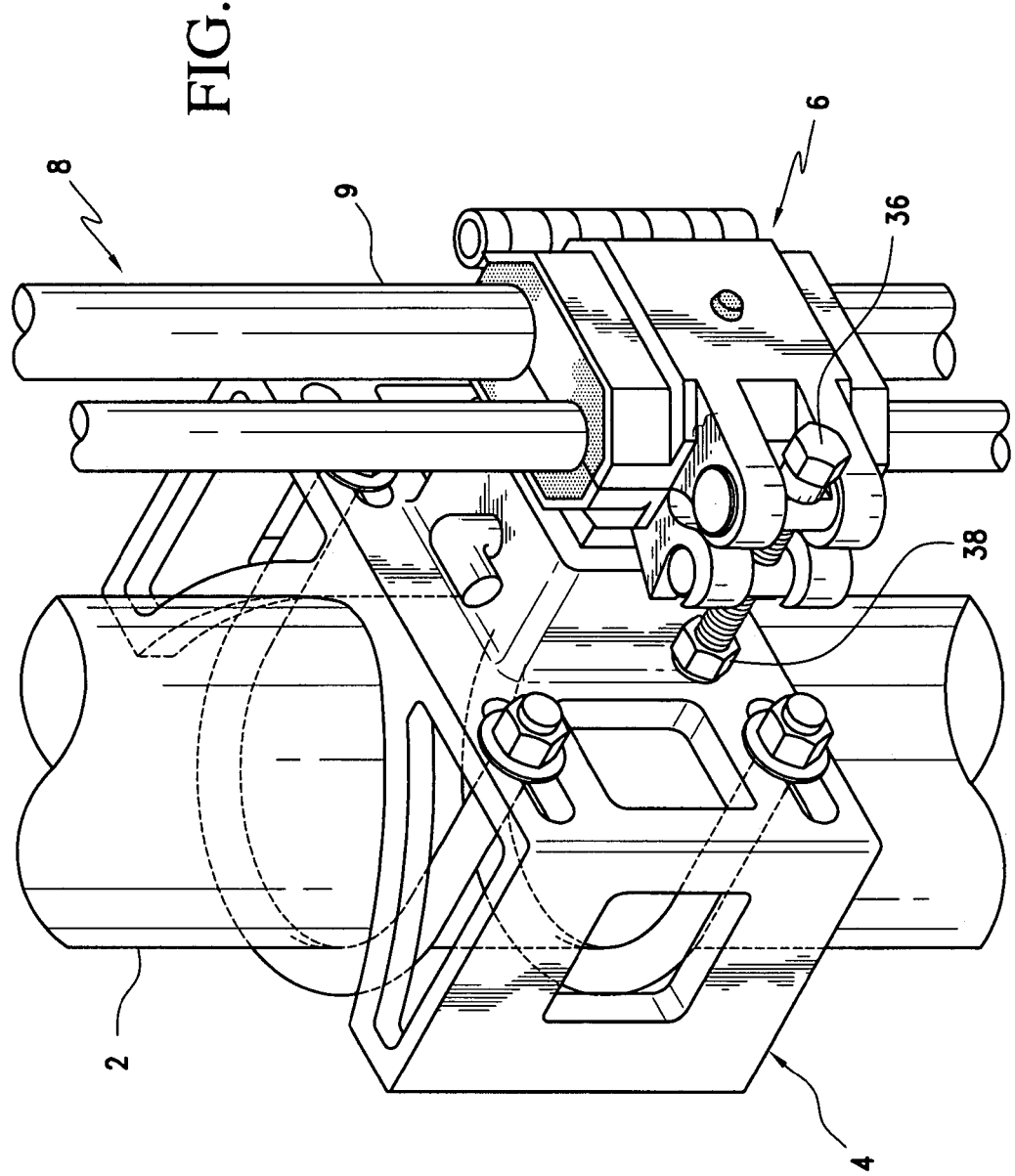
FIG. 1 is a pictorial representation of one embodiment of the invention when m use.
Figure 2:
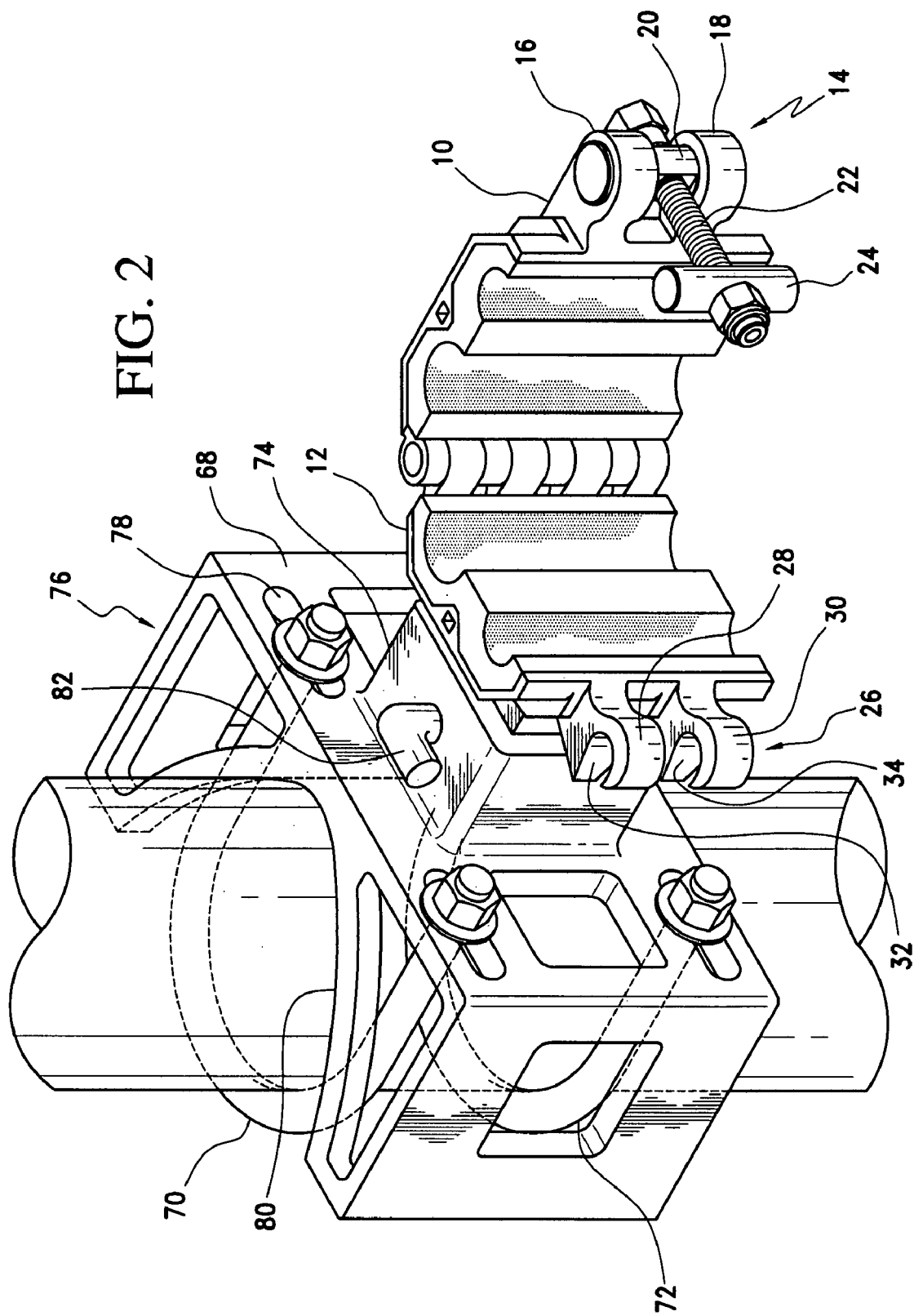
FIG. 2 is a pictorial representation of the invention in FIG. 1 in a different configuration.
Figure 4:
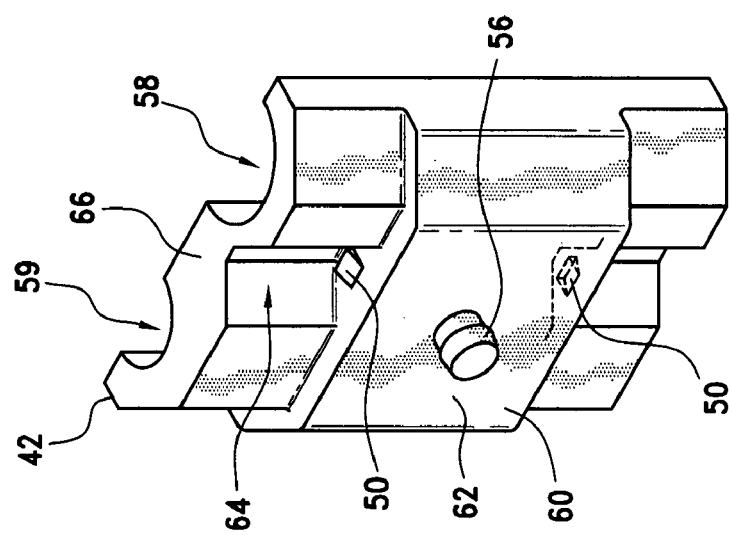
FIG. 4 is a pictorial representation of a portion of the invention as shown in FIG. 3.
Figure 3:
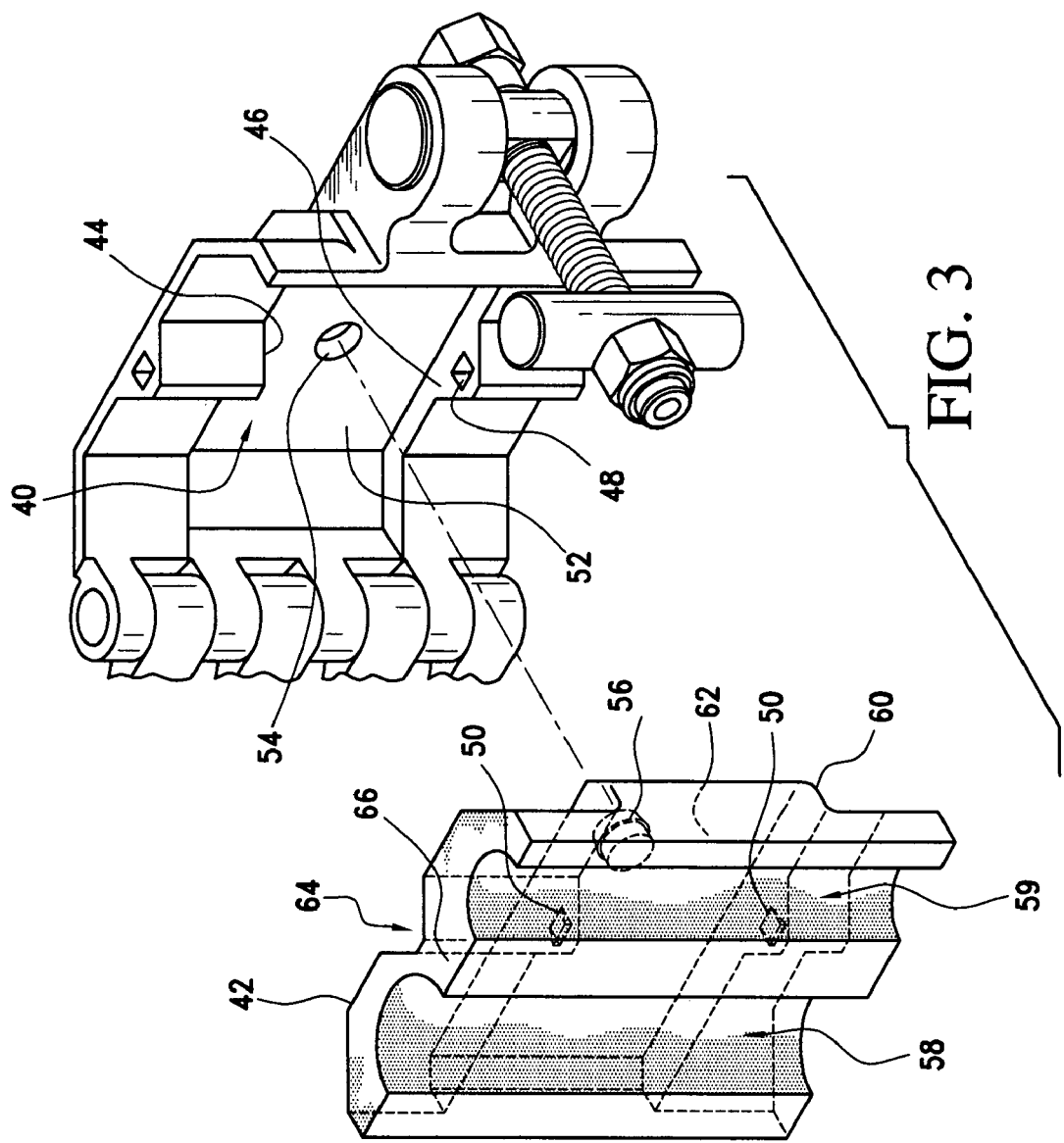
FIG. 3 is an exploded view of a portion of the invention shown in FIGS. 1 and 2.

A novel clamp assembly useful in the combination comprises an upper clamp half 10 and a lower clamp half 12. Each clamp half is hingedly connected along a hinge edge of each clamp half to the other clamp half and latchably connected along a latch edge of each clamp half to the other clamp half by latch structure carried by each clamp half. The latch structure 14 carried by the upper clamp half comprises a pair of parallel ears 16, 18 protruding transversely away from the latch edge of the upper clamp half and defining a pair of aligned boreholes, a pivot pin 20 having a transverse borehole carried by the aligned boreholes through the ears, a bolt 22 carried in the transverse borehole through the pivot pin, and a toggle bar 24 having a threaded transverse borehole therethrough threadably mounted on the bolt. The latch structure 26 carried by the lower clamp half comprises a pair of parallel ears 28, 30 protruding transversely from the latch edge of the lower clamp half and defining a pair of saddles 32, 34 facing away from the upper clamp half when the clamp is in the closed position and contoured for close receipt of the toggle bar. The toggle bar and the pivot pin each have a longitudinal axis which is parallel to the longitudinal axis of the riser when the clamp is mounted on the riser and the clamp is in the closed position. The clamp closed position is shown in FIG. 1. When in the clamp closed position, the pair of parallel ears on the upper clamp half is in superposition to the pair of ears on the lower clamp half.

The bolt has a first end and a second end. The first end is defined by a bolt head 36. The bolt head is positioned adjacent the pivot pin when the clamp is in the closed position. A nut 38 is preferably positioned at the second end of the bolt to prevent unintentional loss of the toggle bar.

Each clamp half preferably has an inner surface defining a laterally bounded depression 40 for receiving and locating a liner element 42 having a portion shaped to fit the depression. The laterally bounded depression preferably has at least two parallel side walls 44, 46. Each side wall preferably has a depression 48 for receiving and locating an ear element 50 of the liner element.

The laterally bounded depression preferably has a generally planar bottom wall 52. Each clamp half preferably further defines a borehole 54 leading from the generally planar bottom wall to an outside surface of the clamp halt for receiving a plug element 56 of a liner element.

A liner element is preferably positioned in each clamp half. Each liner element is formed from a rubbery body having an inner face facing the control line and an outer face to face the inner surface of a clamp half Each liner element has an upper end and a lower end. The inner face of each liner element defines at least one semi cylindrical trough 58 extending from the upper end to the lower end of the element. The outer face defines a protruding block 60 spaced apart from the first end and the second end which is closely received by the depression in the clamp half.

In a preferred embodiment, the liner element has an inner face which defines a pair of parallel semi-cylindrical troughs 58, 59. The troughs can be the same size, or differently sized, depending on the size of the control lines to be clamped. The protruding block defines a generally planar surface 62 and the at least one plug element 56 protrudes outwardly from the generally planar surface. The plug element preferably has a generally cylindrical neck section having a first diameter and a head section having a second diameter which is larger than the first diameter, to permit it to snap lock into the borehole 54. The outer surface of the liner element preferably further defines a first groove 64 extending from the upper end of the insert to an upper end surface of the block and a second groove extending from the lower end of the insert to a lower end surface of the block to provide lateral stability for the liner when positioned in the clamp half The upper end surface of the block and the lower end surface of the block are each preferably generally planar. The outer surface of the liner element preferably further defines a first ear element 50 protruding from the upper end surface of the block and a second ear element protruding from the lower end surface of the block. Each ear element preferably has a generally planar surface 66 facing away from the nose element, to provide a snap lock mechanism in combination with the depressions 48 in the clamp halves.

The mounting assembly 4 preferably comprises a mounting base 68 and a pair of U-bolts 70, 72 connected to the mounting base. The mounting base comprises a base plate having a front side and a back side, a nose-piece 74 extending from the front side of the base plate, and a frame 76 extending from the back side of the base plate for mounting the mounting base to the riser. The mounting base defines four slot-shaped apertures 78 arranged in a rectangular array for receiving the pair of U-bolts. The frame defines a pair of juxtaposed hyperbolic-shaped saddles 80 positioned in parallel planes each for providing the mounting assembly with two-point contact with a tubular member upon which the assembly is mounted.

The nose-piece preferably extends normally from the base plate. The frame preferably comprises four side wall structures extending normally from a periphery of the base plate. The base plate preferably has a generally rectangular periphery, and a pair of opposed side wall structures define the hyperbolic saddles. The nose piece is preferably tubular, most preferably square tubular, and defines a pair of opposed apertures for receipt of a pin 82. A mounting boss extending from the lower clamp half and having a transverse aperture is received by the nose piece and retained in position by the pin.

In use, the invention provides a method for running control lines alongside a riser tube as the riser tube is lowered into a body of water. The method is carried out by fastening a mounting assembly to the riser tube with U bolts. The mounting assembly carries a clamp assembly. The clamp assembly comprises an upper clamp half and a lower clamp half hingedly connected along a hinge edge of each clamp half. The upper clamp half is movable from a clamp open position to a clamp closed position. The upper clamp half carries a latch structure along a latch edge opposite from the hinge edge. The latch structure on the upper clamp half comprises a pair of parallel ears protruding transversely away from the latch edge of the upper clamp half and defining a pair of aligned boreholes, a pivot pin having a transverse borehole carried by the aligned boreholes through the ears, a bolt carried in the transverse borehole through the pivot pin, and a toggle bar having a threaded transverse borehole therethrough threadably mounted on the bolt. The latch structure carried by the lower clamp half along a latch edge opposite from the hinge edge comprises a pair of parallel ears protruding transversely from the latch edge of the lower clamp half and defining a pair of saddles facing away from the upper clamp half and contoured for close receipt of the toggle bar. The bolt is movable from a disengagement position to an engagement position, and the toggle is movable from an unlatched position to a latched position. A control line is positioned in the clamp assembly when the clamp assembly is in the clamp open position, the bolt is in a disengagement position, and the toggle is in an unlatched position. The upper clamp half is moved into the clamp closed position, the bolt is moved into the engagement position, and the toggle is moved into the latched position. The riser is then lowered, and the method is repeated as necessary to provide adequate attachment of the control lines to the riser along its length.

While certain preferred embodiments of the invention are described herein, the invention is not to be construed as being so limited, except to the extent that such limitations are found in the claims.

What is claimed is:

1. A clamp assembly comprising an upper clamp half and a lower clamp half, each clamp half hingedly connected along a hinge edge of each clamp half to the other clamp half and latchably connected along a latch edge of each clamp half to the other clamp half by latch structure carried by each clamp half, wherein the latch structure carried by the upper clamp half comprises a pair of parallel ears protruding transversely away from the latch edge of the upper clamp half and defining a pair of aligned boreholes, a pivot pin having a transverse borehole carried by the aligned boreholes through the ears, a bolt carried in the transverse borehole through the pivot pin, and a toggle bar having a threaded transverse borehole therethrough threadably mounted on the bolt, and wherein the latch structure carried by the lower clamp half comprises a pair of parallel ears protruding transversely from the latch edge of the lower clamp half and defining a pair of saddles facing away from the upper clamp half and contoured for close receipt of the toggle bar.

2. A clamp assembly as in claim 1 wherein the pair of parallel ears on the upper clamp half is in superposition to the pair of ears on the lower clamp half when the clamp is in a closed position.

3. A clamp assembly as in claim 2 wherein the bolt has a first end and a second end, the first end being defined by a bolt head, said bolt head being positioned adjacent the pivot pin when the clamp is in the closed position.

4. A clamp assembly comprising an upper clamp half and a lower clamp half, each clamp half hingedly connected along a hinge edge of each clamp half to the other clamp half and latchably connected along a latch edge of each clamp half to the other clamp half by latch structure carried by each clamp half, wherein the latch structure carried by the upper clamp half comprises a pair of parallel ears protruding transversely away from the latch edge of the upper clamp half and defining a pair of aligned boreholes, a pivot pin having a transverse borehole carried by the aligned boreholes through the ears, a bolt carried in the transverse borehole through the pivot pin, and a toggle bar having a threaded transverse borehole therethrough threadably mounted on the bolt, and wherein the latch structure carried by the lower clamp half comprises a pair of parallel ears protruding transversely from the latch edge of the lower clamp half and defining a pair of saddles facing away from the upper clamp half and contoured for close receipt of the toggle bar, wherein each clamp half has an inner surface defining a laterally bounded depression for receiving and locating a liner element having a portion shaped to fit the depression.

5. A clamp assembly as in claim 4 wherein the laterally bounded depression has at least two parallel side walls, each side wall having a depression for receiving and locating an ear element of a liner element.

6. A clamp assembly as in claim 5 wherein the laterally bounded depression has a generally planar bottom wall, each clamp half further defining a borehole leading from the generally planar bottom wall to an outside surface of the clamp half, for receiving a plug element of a liner element.

7. A clamp assembly as in claim 6 further comprising a liner element carried by each clamp half, each liner element being formed from a rubbery body having an inner face to face an object to be clamped and an outer face to face an inner surface of a clamp half, an upper end and a lower end, said inner face defining at least one semi cylindrical trough extending from the upper end to the lower end of the liner element, said outer face defining a protruding block spaced apart from the first end and the second end which is closely received by the depression.

* * * * *